(12) United States Patent
Heyworth et al.

(10) Patent No.: US 7,685,022 B1
(45) Date of Patent: Mar. 23, 2010

(54) SYSTEM AND METHOD OF OFFERING MEDIA CONTENT

(75) Inventors: Samuel Heyworth, Seattle, WA (US); Jon Phillips, Seattle, WA (US); Erich Ringewald, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 59 days.

(21) Appl. No.: 11/818,775

(22) Filed: Jun. 15, 2007

(51) Int. Cl.
*G06Q 30/00* (2006.01)

(52) U.S. Cl. ........................................ 705/26
(58) Field of Classification Search ................. 705/26, 705/27
See application file for complete search history.

(56) References Cited

U.S. PATENT DOCUMENTS

| | | | |
|---|---|---|---|
| 7,444,353 B1 * | 10/2008 | Chen et al. | 707/104.1 |
| 2003/0028451 A1 * | 2/2003 | Ananian | 705/27 |
| 2005/0038819 A1 * | 2/2005 | Hicken et al. | 707/104.1 |
| 2006/0218613 A1 * | 9/2006 | Bushnell | 725/109 |
| 2006/0271620 A1 * | 11/2006 | Beaty et al. | 709/203 |
| 2007/0255722 A1 * | 11/2007 | Leffert et al. | 707/10 |
| 2008/0126303 A1 * | 5/2008 | Park et al. | 707/3 |

* cited by examiner

*Primary Examiner*—Mila Airapetian
(74) *Attorney, Agent, or Firm*—Finnegan, Henderson, Farabow, Garrett & Dunner L.L.P.

(57) ABSTRACT

A system and method of offering media content is disclosed. In one embodiment, the method includes receiving a selection of a disaggregated media content item from a user computer at a server via an online site that offers a catalog of items. The method also includes identifying a catalog item related to the selected disaggregated media content item. Further, the method includes displaying a detail interface via the online site, the detail interface including details related to the disaggregated media content item and a recommendation of the identified catalog item. A graphical user interface (GUI) is disclosed that includes a song-level detail page including a plurality of details related to an individual song available for download via an online site. The GUI includes at least one recommendation of at least one other item associated with a performer of the individual song, where the other item(s) are offered via the online site.

18 Claims, 12 Drawing Sheets

SYSTEM AND METHOD OF OFFERING MEDIA CONTENT

FIELD OF THE DISCLOSURE

The present disclosure is generally related to offering media content.

BACKGROUND

Public data networks provide a convenient way for individuals to procure media content, such as music, movies, and other audio and video content. Many user computers include media content player applications that allow such individuals to listen to and view media content. Customers often wish to download individual songs, but sources of media content typically arrange media content items, such as songs, by collections, such as albums. This prevents customers from obtaining song-specific information, reviews, and recommendations. Hence, there is a need for an improved system and method of offering media content.

SUMMARY

A system to offer media content is disclosed and includes a computing device including processing logic and memory accessible to the processing logic. The memory stores instructions executable by the processing logic to receive a selection of a disaggregated media content item from a user computer at a server via an online site that offers a catalog of items. The memory also stores instructions executable by the processing logic to identify another catalog item related to the selected disaggregated media content item and to display a detail interface via the online site. The detail interface includes details related to the disaggregated media content item and a recommendation of the other catalog item.

In another particular embodiment, a method of offering media content is disclosed and includes receiving a selection of a disaggregated media content item from a user computer at a server via an online site that offers a catalog of items. The method also includes identifying another catalog item related to the selected disaggregated media content item. Further, the method includes displaying a detail interface via the online site, the detail interface including details related to the disaggregated media content item and a recommendation of the other catalog item.

In another particular embodiment, a method of offering media content is disclosed and includes receiving a selection of a purchasable item from a user computer at a server via an online site that offers a catalog of items. The method also includes identifying a disaggregated catalog item related to the selected purchasable item. The method also includes displaying a detail interface via the online site, the detail interface including details related to the purchasable item and a recommendation of the identified disaggregated catalog item.

In another particular embodiment, a graphical user interface is disclosed and includes a song-level detail page including a plurality of details related to an individual song available for download via an online site. The GUI includes at least one recommendation of at least one other item associated with a performer of the individual song, the other item(s) offered via the online site.

In another particular embodiment, a computer-readable medium is disclosed and includes processor-readable instructions that are executable by a processor to perform a method comprising receiving a selection of a disaggregated media content item from a user computer at a server via an online site that offers a catalog of items; identifying another catalog item related to the selected disaggregated media content item; and displaying a detail interface via the online site, the detail interface including details related to the disaggregated media content item and a recommendation of the other catalog item.

DETAILED DESCRIPTION

Figure 1:
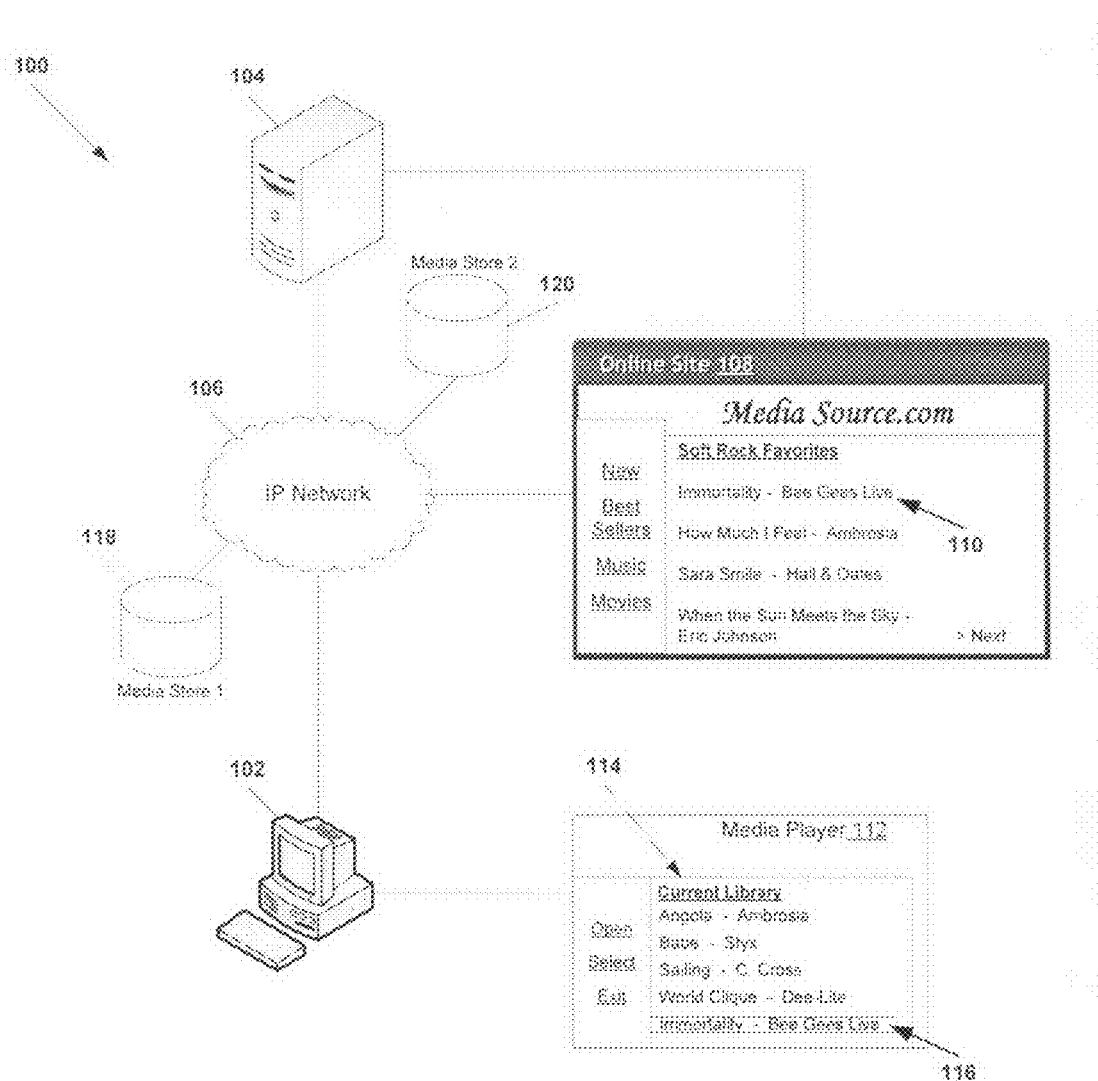
FIG. 1 is a general diagram illustrating a particular embodiment of a system to manage media content.

Referring to FIG. 1, a particular embodiment of a system to manage media content is illustrated and designated generally 100. The system 100 includes a user computer 102 adapted to communicate with a server 104 via a network 106, such as the Internet, another public data network, or a private Internet Protocol (IP) network. In one embodiment, the user computer 102 and the server 104 can communicate with one or more media content data stores, such as the first media store 118 and the second media store 120, via the network 106. The media stores 118 and 120 can each be associated with a uniform resource locator (URL) or other network location.

The server 104 can be adapted to provide an interface, such as an online site 108, to offer one or more media content items via the network 106. In an illustrative, non-limiting embodiment, the online site 108 can provide song detail pages that display artist or cast information, customer reviews, and other information typically provided with respect to complete CDs or albums, on a per song basis. The user computer 102 can be adapted to request one or more media content items via the online site 108, such as a song 110, a movie, other audio or video content items, or any combination thereof. The user computer 102 includes at least one media content player application 112 that is adapted to play media content items at the user computer 102. The media content player 112 can include one or more libraries 114. Media content player applications can include, for example, iTunes (Apple, Inc.; Cupertino, Calif.); Windows Media Player (Microsoft Corp.; Redmond, Wash.); RealPlayer (RealNetworks, Inc.; Seattle, Wash.); QuickTime (Apple, Inc.; Cupertino, Calif.); other media content player applications; or any combination thereof.

In one embodiment, the user computer 102 sends a request for the media content item 110 to the server 104 via the online site 108. The server 104 can receive the request and generate a payload file that includes a URL or other network location associated with the media content item 110, such as a URL of the first media store 118. The payload file can be sent after receiving payment information from the user computer 102 and can be encrypted to protect the URL and other information. The payload file is received at the user computer 102, and the user computer 102 can launch a download management application in response. For instance, a file type associated with the payload file can be compared with an association table to determine that the download management application is to be launched in order to read the payload file.

The download management application can decrypt the payload file and download the requested media content item 110 using the URL of the first media store 118. In another embodiment, the payload file includes a URL of the online site 108. After decrypting the payload file, the download management application requests the media content item from the online site 108 using the URL. The online site 108 verifies the request and points the download management application to the media source, such as the first media store 118. In an illustrative, non-limiting embodiment, the online site 108 uses this re-direction process to count or otherwise track requests for media content items.

In addition, the download management application can automatically add the media content item to a library of a pre-selected media content player application, such as the library 114 of the media content player 112. Hence, the user need not download the media content item and separately add the media content item to the library 114. In one example, the download management application can open the media content player 112 at the user computer 102 and can show the requested media content item 116 at the library 114. As illustrated, the requested media content item can be highlighted or otherwise emphasized to show its addition to the library 114.

If the request for the media content item 110 is the first request for a media content item received from the user computer 102 via the online site 108, the server 104 can send a download management application to the user computer 102 for installation. In another embodiment, the download management application can be sent to the user computer 102 after the server 104 runs a diagnostic test on the user computer 102 to determine whether the download management application is installed. In another embodiment, the download management application can be sent to the user computer 102 after the server 104 determines that the request is a first request received from the user computer 102 after a registration process is complete. In another example, the download management application can be sent to the user computer 102 after the user computer 102 indicates to the server 104 that the file type associated with the payload file is not recognized. In still another example, the online site provides a manually selectable indicator of an option to download the download management application, and the download management application can be sent to the user computer 102 after a manual selection of the indicator is received via the online site 108.

During or after installation, the download management application can prompt the user to designate a media content player application, a library, a playlist, or any combination thereof, to which media content items will automatically be added when they are downloaded. The media content player application can be selected from one of a plurality of media content player applications stored at the user computer 102, such that downloading of media content items via the online site 108 is not tied to a particular media content player application. In one embodiment, the user has the option to change the designated media content player application, library, playlist, or any combination thereof, for example, when a new media content player application is added at the user computer 102 or when the user's preferences change.

In another embodiment, the download management application can include a sniffer portion to determine what media content player applications are installed the user computer 102. Further, the download management application can automatically select or recommend one of the installed media content player applications, such as a most used media content player application within a particular period or a most recently used media content player application. The download management application can automatically select a media content player application, to which media content items will automatically be added when they are downloaded, or to present a list of media content player applications, a recommended media content player application, or any combination thereof, at the user computer 102 for selection by a user.

Figure 2:
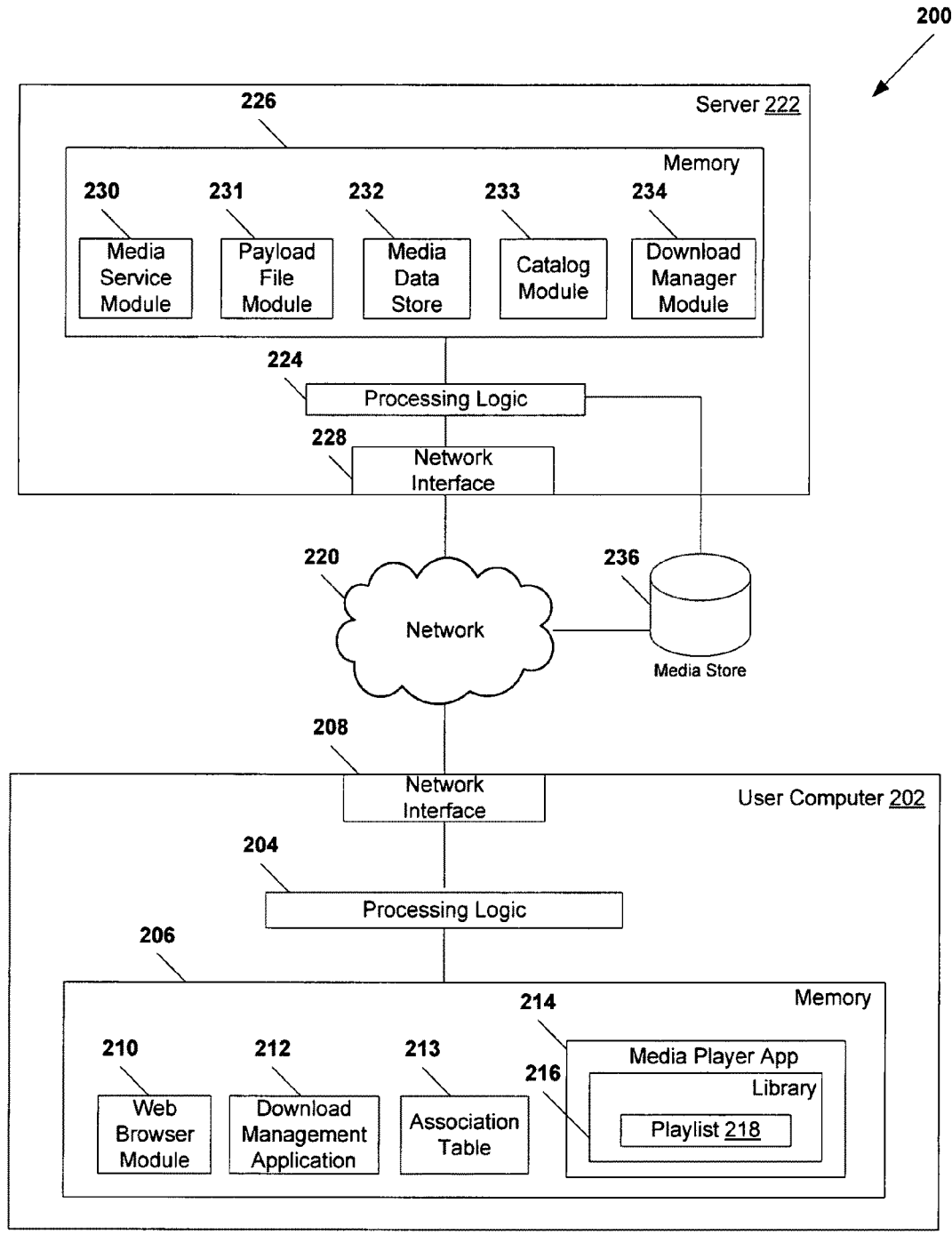
FIG. 2 is a block diagram illustrating a second particular embodiment of a system to manage media content.

Referring to FIG. 2, a second particular embodiment of a system to manage media content is illustrated and designated generally 200. The system 200 includes a user computer 202 adapted to communicate with a server 222 via a network 220, such as the Internet or another public data network. The user computer 202 includes processing logic 204 and memory 206 accessible to the processing logic 204. The user computer 202 also includes a network interface 208 adapted to facilitate communication between the user computer 202 and the network 220.

As illustrated in FIG. 2, the memory 206 includes various modules 210-214 adapted to implement various functions of the user computer 202. For example, the plurality of modules 210-214 can include hardware logic, instructions executable by the processing logic 204, or a combination thereof. In one embodiment, the plurality of modules 210-214 includes software instructions embodied within one or more computer programs stored within the memory 206.

The memory 206 includes a web browser module 210 executable by the processing logic 204 to provide a web browser interface that enables a user to interact with an online site provided by the server 222, or by another system communicating with the server 222, via the network 220. The online site can provide one or more media content items that a user can request for download to the user computer 202. The media content item(s) can include video, audio, or any combination thereof. Further, the media content item(s) can be embodied within one or more electronic files, such as a Moving Picture Experts Group (MPEG) file, a MPEG audio layer 3 (MP3) file, a Windows Media Player (.wmp) file, a waveform audio format (.wav) file, another media file, or any combination thereof. Electronic files including the media content item(s) may also include digital rights management (DRM) data to protect the media content item(s) from unauthorized copying.

The user computer 202 can receive a payload file from the server 222 in response to a request for one or more media content items via the online site. The memory 206 can include a download management application 212 that is executable by the processing logic 204 to launch in response to the user computer 202 receiving the payload file. In one example, the memory 206 includes an association table 213 that relates various file types with applications adapted to read the files at the user computer 202. The payload file can have a file type that is associated with the download management application 212, such that the user computer 202 launches the download management application 212 when the payload file is received.

The download management application 212 is executable by the processing logic 204 to download the requested media content item(s) to the user computer 202. For example, the download management application 212 can be executable by the processing logic 214 to read the payload file and obtain one or more uniform resource locators (URLs) or other network locations from which the requested media content item(s) can be downloaded. The download management application 212 can be executable by the processing logic 204 to interact with media stores, such as the media store 236, via the URL(s) and to download the media content item(s). In another embodiment, the server 222 retrieves the media content from the media store 236, and the download management application 212 is executable by the processing logic 204 to download the media content item to the user computer 202 from the server 222 directly or via an online site provided by the server 202. In yet another embodiment, the payload file includes a URL of the online site, and the online site re-directs the download management application 212 to the media store 236 to download the media content item.

In addition, the download management application 212 is executable by the processing logic 204 to automatically open a pre-selected media content player application 214 and to add the media content item to a library 216 of the pre-selected media content player application. In one embodiment, the download management application 212 can be executable by the processing logic 204 to import the media content item to a user-designated playlist 218 associated with the library 216.

In another embodiment, the download management application 212 is executable by the processing logic 204 to store media content at a generalized storage location at the user computer 202 that is associated with the online site, such as a user-defined folder or a folder created by the download management application 212. The download management application 212 is executable by the processing logic 204 to inform the library 216 or media content player application 214 of new media content items added to the storage location, and the library 216 or media content player application 214 can import the new media content items.

The download management application 212 can be installed at the user computer 202 automatically or in response to a manual selection of an indicator corresponding to the download management application at the online site. During or after installation, the download management application 212 can be executable by the processing logic 204 to prompt the user to designate a media player application, such as the media content player application 214, to which the download management application 212 will automatically add media content items when they are downloaded to the user computer 202. The selected media player application can be one of a plurality of media content player applications at the user computer 202. In addition, the user can designate a library 216, a playlist 218, or any combination thereof to which such media content items will be added.

In another embodiment, the download management application 212 is executable by the processing logic 204 to determine what media content player applications are installed the user computer 202. Further, the download management application can be executable by the processing logic 204 to automatically select a media content player application, to which media content items will automatically be added when they are downloaded, or to present a list of media content player applications, a recommended media content player application, or any combination thereof, at the user computer 202 for selection by a user.

In one embodiment, the download management module 212 is executable by the processing logic 204 to determine that a new media player has been added at the user computer 202 and to prompt the user to specify whether the pre-selected media player application 214 (to which media content items are automatically added) should be changed to the added media player. Further, the download management module 212 can be executable by the processing logic 204 to receive preference changes from a user specifying another media content player stored at the user computer 202 as the pre-selected media content player to which media content items are to be automatically added.

The server 222 includes processing logic 224 and memory 226 accessible to the processing logic 224. Further, the server 222 includes a network interface 228 that facilitates communication between the server 222 and the network 220. In addition, the memory 226 includes various modules 230-234 adapted to implement various functions of the server 222. For example, the plurality of modules 230-234 can include hardware logic, instructions executable by the processing logic 224, or a combination thereof. In one embodiment, the plurality of modules 230-234 includes software instructions embodied within one or more computer programs stored within the memory 226.

The memory 226 includes a media service module 230 that is executable by the processing logic 224 to provide an online site via the network 220. The online site includes an interface that allows users to request one or more media content items for download. In one embodiment, the media content item(s) are downloaded in return for a payment at an electronic commerce site that also provides other goods and services for sale. The media service module 230 can be executable by the processing logic 224 to receive a request for one or more media content items from the user computer 202 via the online site.

The memory 226 can include a payload file module 231 that is executable by the processing logic 224 to generate a payload file in response to a request for one or more media content items from the user computer 202. The payload file can include encrypted data indicating one or more URLs associated with the requested media content item(s) and other information. The payload file module 231 can be executable by the processing logic 224 to encrypt the payload file and send the encrypted payload file to the user computer 202.

In one embodiment, the media service module 230 can be executable by the processing logic 224 to retrieve the requested media content item(s) from the media data store 232, the media store 236, or a combination thereof, and to interact with the download management application 212 to download the media content item to the user computer 202. In another embodiment, the media service module 230 can re-direct the download management application 212 to retrieve the requested media content item(s) from the media data store 232, the media store 236, or a combination thereof. In another embodiment, the user computer 202 interacts directly with one or more media stores, such as the media store 236, via the URL(s) provided in the payload file, to download the requested media content item(s).

In addition, the memory 226 can include a download manager module 234 that is executable by the processing logic 224 to send a download management application to the user computer 202, if one is not already installed at the user computer 202. For instance, the media service module 230 can be executable by the processing logic 224 to determine whether the user computer 202 has previously submitted a request for a media content item via the online site. If the request is the first request for a media content item received from the user computer 202, the download manager module 234 can be executable by the processing logic 224 to send the download management application 212 to the user computer 202 for installation.

In another embodiment, the media service module 230 can be executable by the processing logic 224 to run a diagnostic test on the user computer 202 to determine whether the download management application 212 is installed. If the download management application 212 is not installed at the user computer, the download manager module 234 can be executable by the processing logic 224 to send the download management application 212 to the user computer 202 for installation. In a further embodiment, the server 222 receives an indication from the user computer 202 that a file type of the payload file is not recognized, and the download manager module 234 is executable by the processing logic 224 to send the download management application 212 to the user computer 202 for installation in response to the indication. In still another embodiment, the online site provides a selectable indicator of an option to download the download management application, and the download manager module 234 is executable by the processing logic 224 to send the download management application 212 to the user computer 202 for installation in response to a selection of the indicator.

In yet another embodiment, the download manager module 234 is executable by the processing logic 224 to send the download management application 212 to the user computer 202 for installation in response to a selection received from the user computer 202, where the selection corresponds to an indicator related to the download management application at the online site.

In one embodiment, the download manager module 234 is executable by the processing logic 224 to install the download management application 212 at the user computer 202. Alternatively, the user can initiate installation of the download management application 212 after it is received at the user computer 202.

In a particular embodiment, the memory 226 includes a catalog module 233 that stores an identifier associated with each item in a catalog of items offered via the online site provided by the server 222. The items include goods and services, where the goods include aggregated items (e.g., an album or compact disc (CD)) and disaggregated items, such as a song, a movie, a book chapter, or another audio or video item that can be downloaded electronically, but in which actual ownership is not transferred to a purchaser or other user. When the server 222 receives a selection of an item, the catalog module 233 is executable by the processing logic 224 to determine the identifier of the selected item. Further, the catalog module 233 is executable by the processing logic 224 to identify one or more other items in the catalog having identifiers related to the identifier of the selected item. For instance, the catalog module 233 includes a table or other associative instrument relating various identifiers or groups of identifiers with other identifiers or groups of identifiers. Based on the relevant identifiers, the catalog module 233 is executable by the processing logic 224 to determine one or more recommended items. The media service module 230 is executable by the processing logic 224 to display a detail interface related to the selected item, which includes a list of the recommended item(s).

Figure 8:
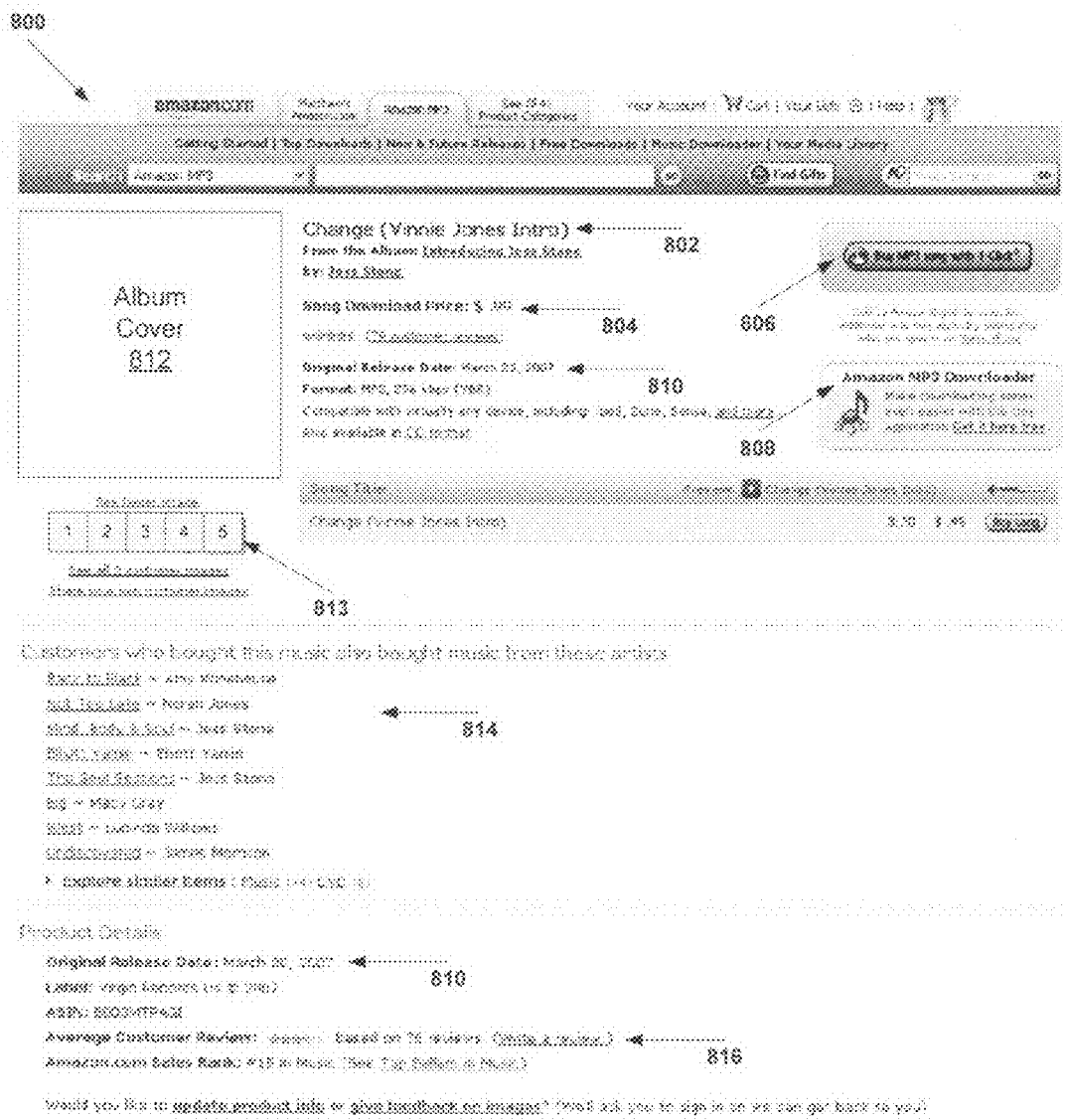
FIG. 8 is a general diagram of an illustrative embodiment of an interface to an online site offering media content.

In an illustrative example, the server 222 receives a selection from the user computer 202 of a disaggregated item, such as an individual song, which is offered for download via the online site. The catalog module 233 is executable by the processing logic 224 to determine the identifier of the individual song and to identify one or more other catalog items associated with identifiers that are related to the identifier of the individual song. For instance, items related to Celine Dion could have related identifiers, such as identifiers within a certain group or identifiers having common alphanumeric portions (e.g., CeDi-xxxx). If the selection received from the user computer 202 relates to the song, "Immortality" featuring Celine Dion, the server 222 determines the identifier of the song. In addition, the server 222 identifies other catalog items related to Celine Dion based on their identifiers. Such items could include goods, such as Celine perfume, a Celine Dion DVD, or Celine Dion concert tickets; disaggregated items, such as a Celine Dion ringtone or another Celine Dion song; or any combination thereof. Further, the media service module 230 is executable by the processing logic 224 to display a song-level detail interface related to the song "Immortality." The song-level detail page includes details related to the song and recommendations of the other identified catalog items(s) related to Celine Dion. An example of a song-level detail interface is illustrated in FIG. 8.

In another example, the server 222 receives a selection of a movie, such as "Zoya." The catalog module 233 is executable by the processing logic 224 to determine the unique identifier of the movie and to identify one or more other associated catalog items, such as Zoya, the novel by Danielle Steel; Danielle perfume; DVDs or other catalog items associated with Danielle Steel or Melissa Gilbert (starring actress); disaggregated items, such as an individual chapter of the novel Zoya, or any combination thereof.

Figure 3:
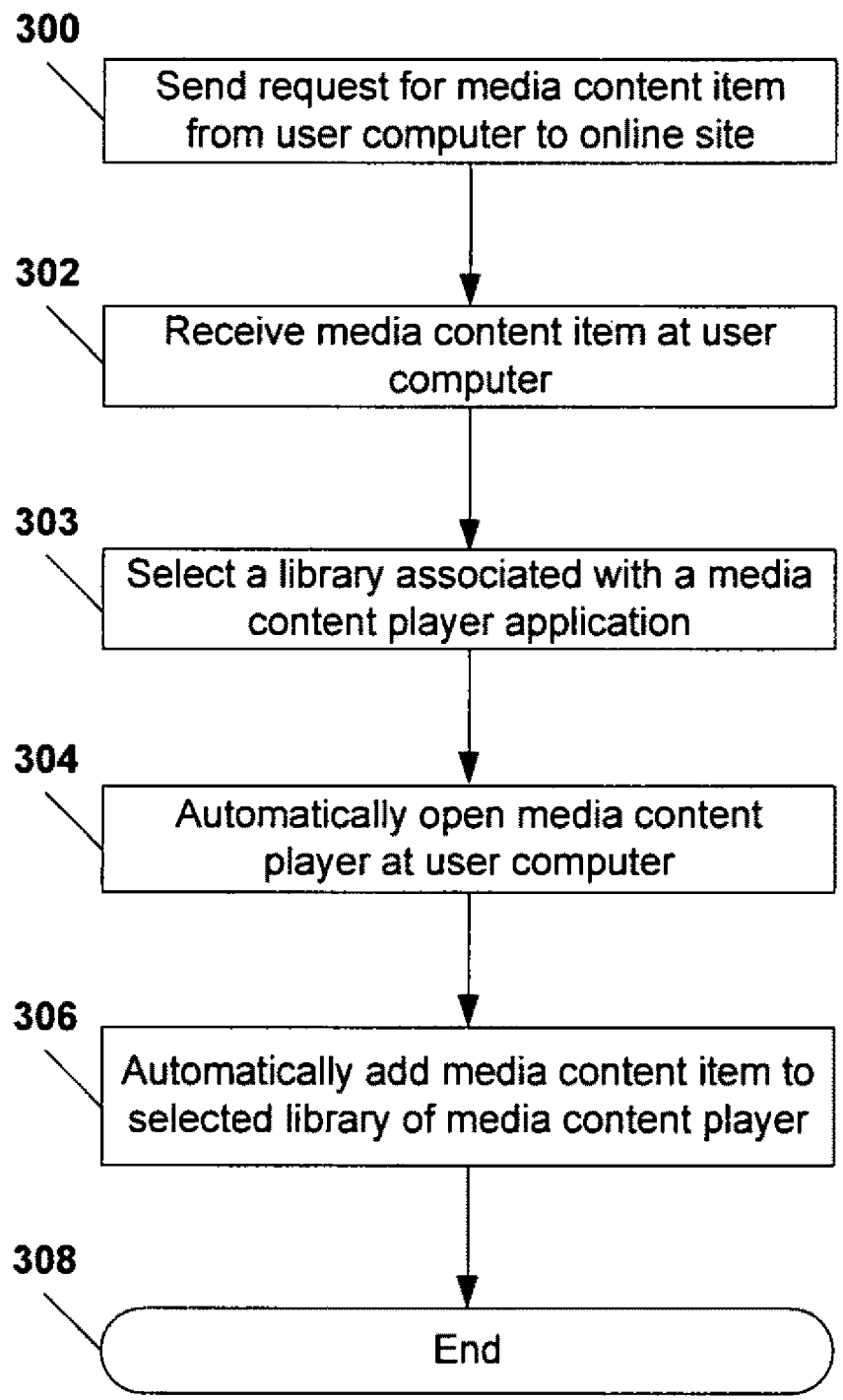
FIG. 3 is a flow diagram illustrating a particular embodiment of a method of managing media content.

Referring to FIG. 3, a particular embodiment of a method of managing media content is illustrated. At block 300, a user computer sends a request for a media content item to a server via an online site that offers one or more media content items. Moving to block 302, the media content item is received at the user computer. In one embodiment, a download management application downloads the media content item to the user computer. At block 303, a content library of a media content player application is selected at the user computer. The content library can be selected by a user in response to a prompt or can be selected automatically by the download management application (e.g., by selecting a content library of a recently used or most used media content player application). Proceeding to block 304, the media content player application associated with the content library is automatically opened at the user computer in response to the download. For example, the download management application can automatically open a particular one of a plurality of media content player applications stored at the user computer, where the particular media content player application is associated with the content library. Continuing to block 306, the media content item is automatically added to the selected content library of the media content player application. In one embodiment, the library is one of a plurality of libraries associated with the media content player application and can also be designated by the user during installation of the download management application or when the user edits one or more preferences stored by the download management application. The method terminates at 308.

Figure 4:
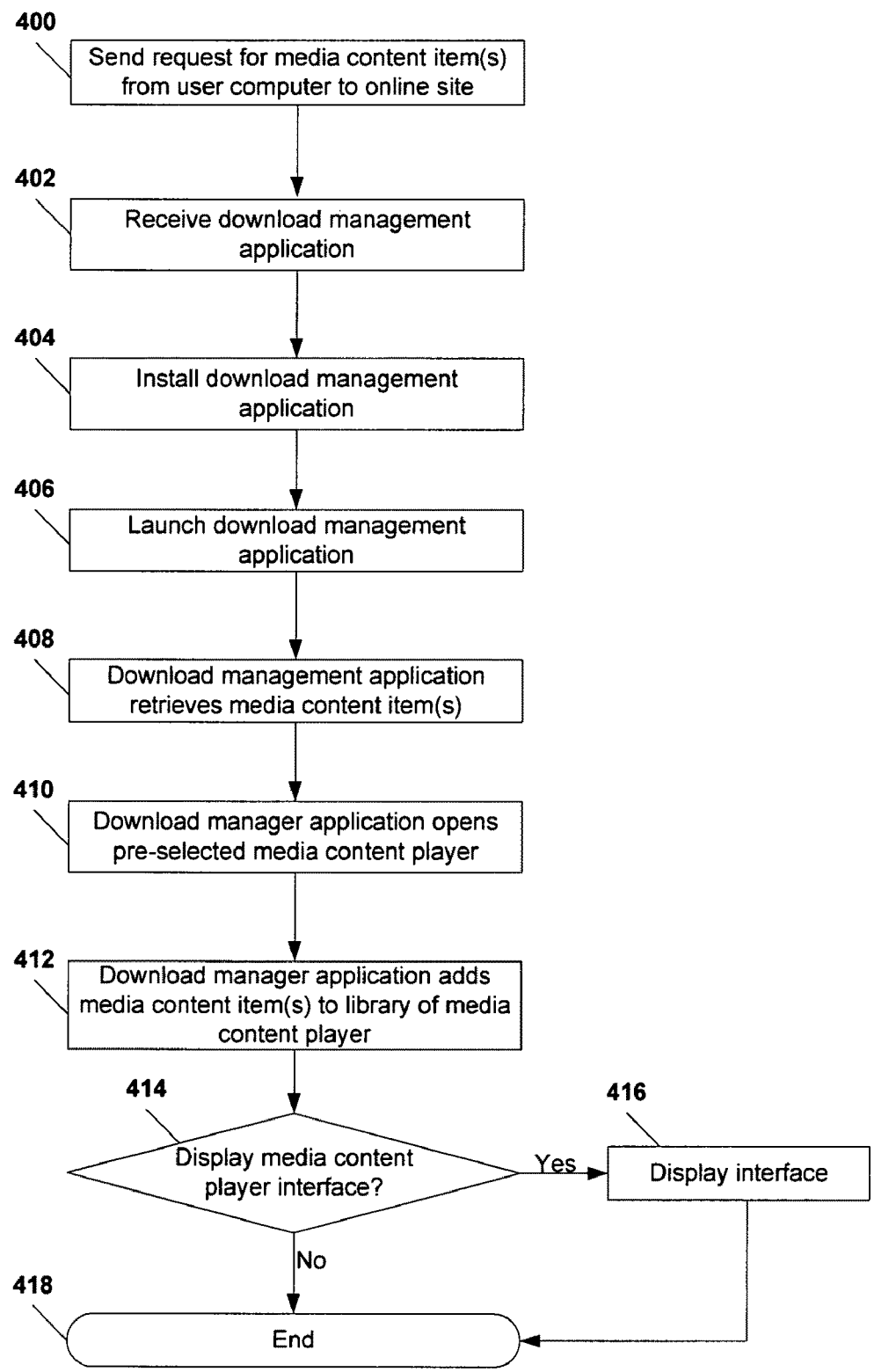
FIG. 4 is a flow diagram illustrating a second particular embodiment of a method of managing media content.

Referring to FIG. 4, a second particular embodiment of a method of managing media content is illustrated. At block 400, a user computer sends a request for one or more media content items to a server via an online site that offers one or more media content items. Moving to block 402, a download management application is received at the user computer. For example, the request for the media content item(s) is a first request sent by the user computer to the online site, and the download management application can be received at the computer for installation prior to receiving the requested media content item(s). Proceeding to block 404, the download management application is installed at the user computer. During or after installation, a user can specify a media content player at the user computer to which media content items should be automatically added after the media content items are downloaded to the user computer.

Continuing to block 406, the download management application is launched at the user computer. Advancing to block 408, the download management application retrieves the requested media content item(s). For instance, the download management application can download the media content item(s) from the online site or from other media sources. At block 410, the download management application automatically opens the pre-selected media content player designated during or after installation of the download management application. Moving to block 412, the download management application adds the downloaded media content item(s) to a library of the media content player. In one embodiment, the media content item(s) are downloaded and added to the media content player library one at a time. In another embodiment, the media content item(s) are all downloaded and then added to the library one at a time. In a further embodiment, the media content item(s) are all downloaded and added to the media content player library as a group.

Proceeding to decision node 414, in one embodiment, the download management application determines whether it is to display an interface of the media content player, such a skin interface or a library listing, after adding the media content item(s) to the library of the media content player. If the download management application determines that it is to display the interface of the media content player, the method moves to block 416, and the interface is displayed at the user computer with the listing(s) of the media content item(s) added to the library of the media content player. An example of such an interface is illustrated in FIG. 1 at 112. The method terminates at 418.

Figure 5:
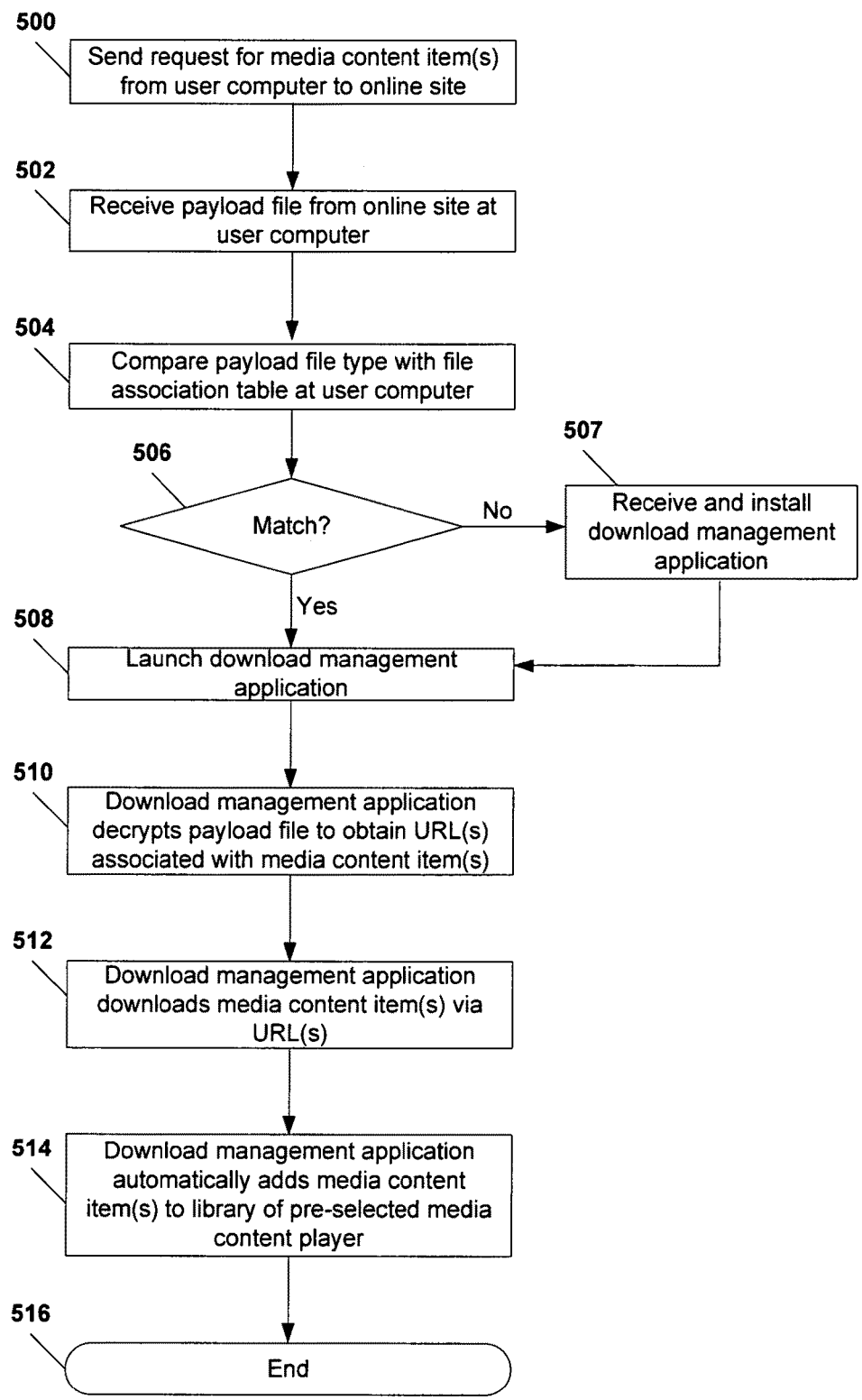
FIG. 5 is a flow diagram illustrating a third particular embodiment of a method of managing media content.

Referring to FIG. 5, a third particular embodiment of a method of managing media content is illustrated. At block 500, a user computer sends a request for one or more media content items to a server via an online site. Moving to block 502, a payload file is received from the server at the user computer. The payload file can have a file type associated with a download management application. Proceeding to block 504, the user computer compares the file type of the payload file with an association table stored at the user computer, which relates file types with applications stored at the user computer. Continuing to decision node 506, the user computer determines whether there is a match to the payload file type within the association table. If there is a match, the method advances to block 508. On the other hand, if there is not a match, the method moves to block 507, and the user computer receives and installs the download management application. The download management application can be received automatically or in response to a manual selection of an option to receive the download management application via the online site. The method then proceeds to block 508.

At block 508, the user computer launches the download management application. Continuing to block 510, the download management application decrypts the payload file received at the user computer to obtain one or more uniform resource locators (URLs) associated with the requested media content item(s). Advancing to block 512, the download management application downloads the media content item(s) via the URL(s). Moving to block 514, the download management application automatically adds the media content item(s) to a library of a user-defined media content player. The media content player can be selected automatically or by a user upon installation of the download management application or when a user changes preferences associated with the download management application. The method terminates at 516.

Figure 6:
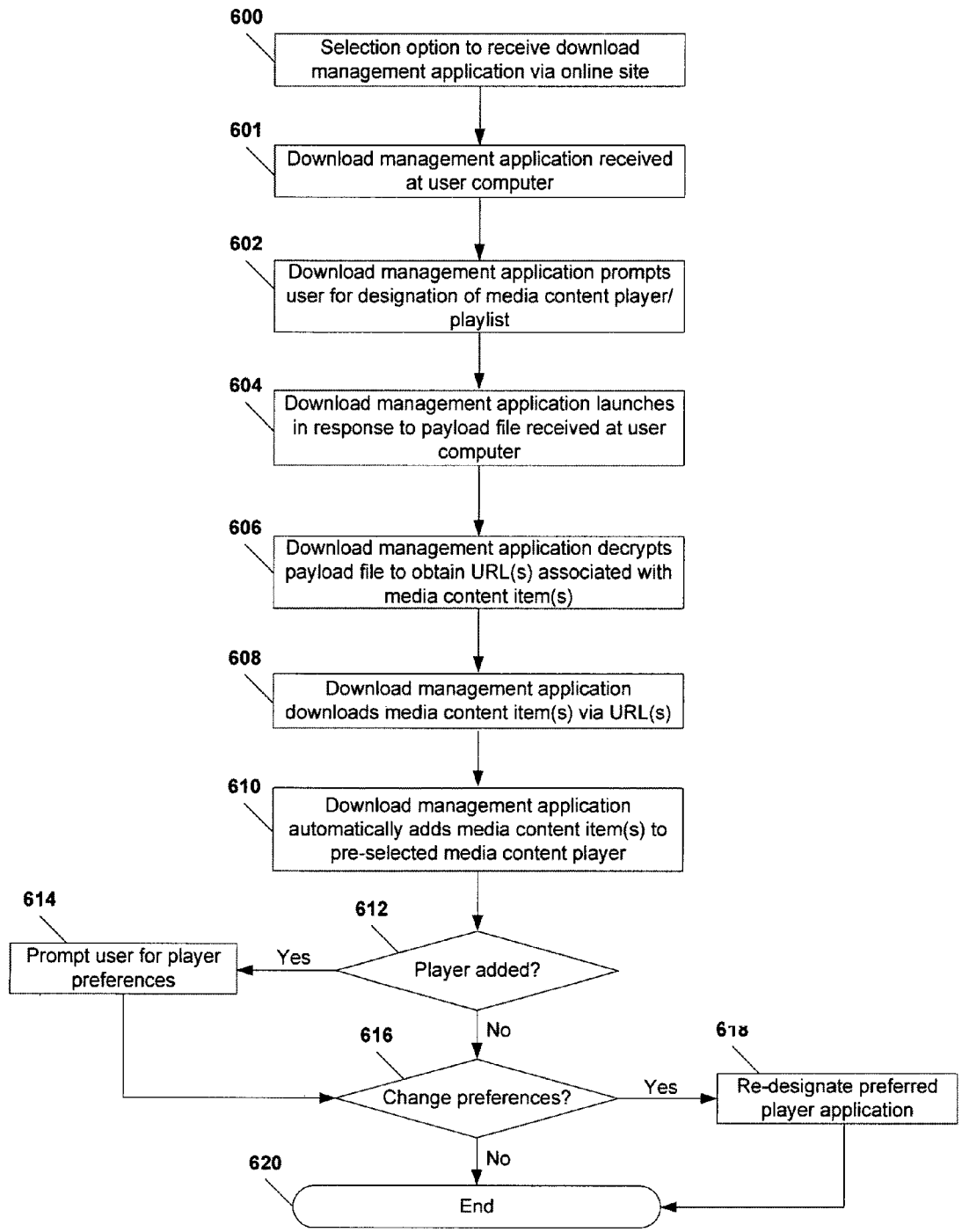
FIG. 6 is a flow diagram illustrating a fourth particular embodiment of a method of managing media content.

Referring to FIG. 6, a fourth particular embodiment of a method of managing media content is illustrated. At block 600, a selection of an option to receive a download management application is sent to a server via an online site. At block 601, a download management application is received from a server at a user computer. The download management application can be received in response to a request for one or more media content items sent by the user computer to the server via an online site. Moving to block 602, the download management application prompts the user to designate a media content player. The designated media content player can be one of a plurality of media content players stored at the user computer. In one embodiment, the user can also designate a library, a playlist, or any combination thereof associated with the selected media content player.

Proceeding to block 604, the download management application is launched at the user computer in response to the user computer receiving a payload file corresponding to a request for one or more media content items sent by the user computer to the server via the online site. Continuing to block 606, the download management application decrypts the payload file received at the user computer to obtain one or more uniform resource locators (URLs) associated with the requested media content item(s). Advancing to block 608, the download management application downloads the media content item(s) via the URL(s). At block 610, the download management application automatically adds the media content item(s) to the user-defined media content player. In one embodiment, the media content player can add the media content item(s) to a library, a playlist, or any combination thereof, associated with the media content player.

Moving to decision node 612, in one embodiment, the download management application can determine whether a new media content player is added at the user computer. If a new media content player is not added, the method proceeds to decision node 616. Conversely, if a new media content player has been added, the download management application prompts the user for any changes to preferences, such as whether the user wishes to designate the new media content player as the player to which media content items should be automatically added. The method then moves to decision node 616.

At decision node 616, the download management application determines whether it is to change user preferences, such as the designation of the media content player. If the download management application determines that such preferences are to be changed, the method moves to block 618, and the download management application can re-designate a preferred media content player based on inputs from the user at the user computer. The method terminates at 620.

Figure 7:
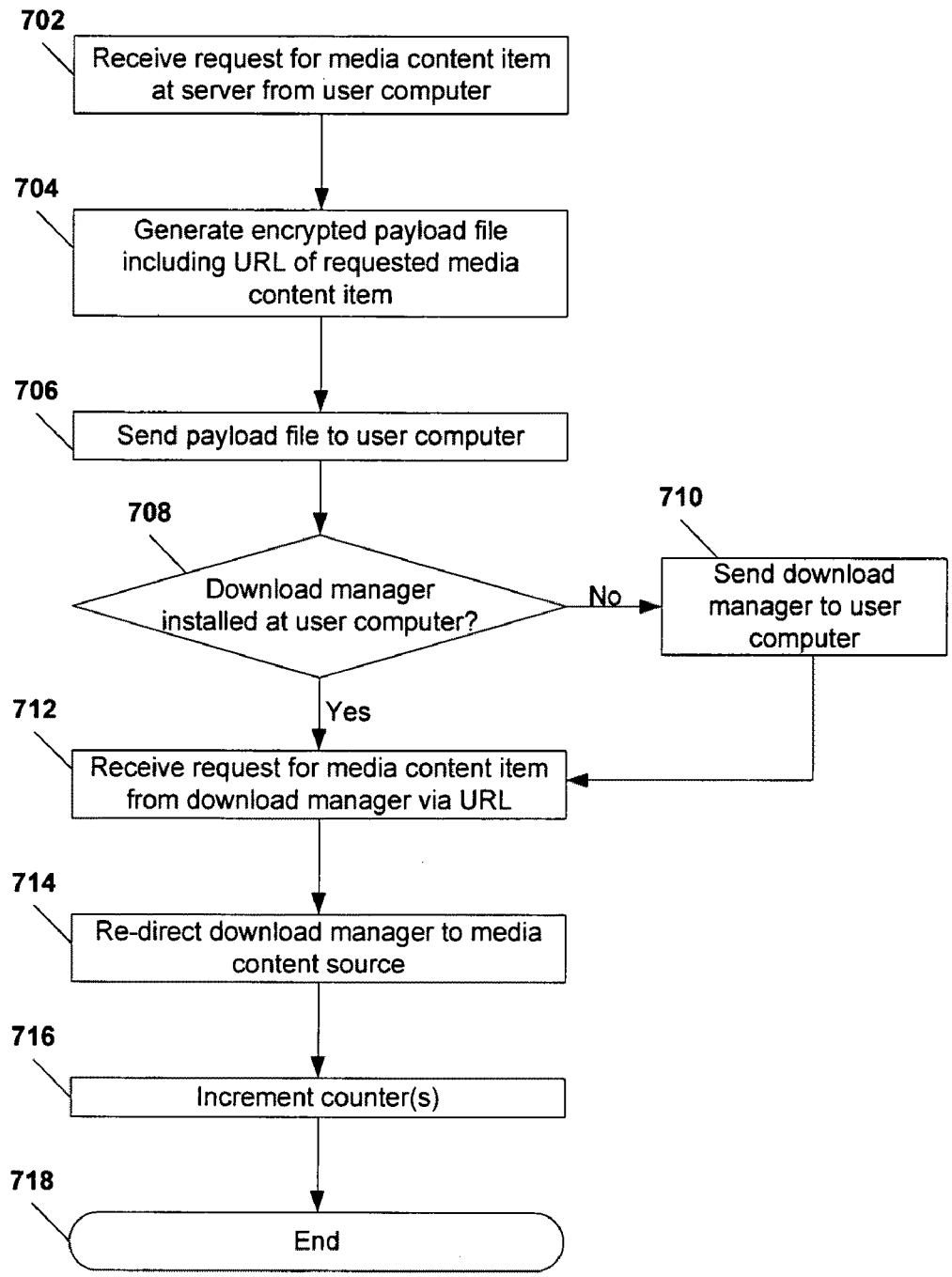
FIG. 7 is a flow diagram illustrating a fifth particular embodiment of a method of managing media content.

Referring to FIG. 7, a particular embodiment of a method of managing media content is illustrated. At block 702, a server receives a request for a media content item from a user computer. In one embodiment, the server or multiple servers can provide an online site that offers one or more media content items, and the request can be received via the online site. Moving to block 704, the server generates a payload file that includes a uniform resource locator (URL) of a media content source from which the requested media content item can be downloaded. Proceeding to block 706, the server sends the payload file to the user computer.

Continuing to decision node 708, the server determines whether a download management application is installed at the user computer. For example, the server can perform a diagnostic test with respect to the user computer; determine whether the request is a first request received from the user computer; receive an indication that a file type associated with the payload file is not recognized at the user computer; or receive a selection of an indicator of an option to download the download management application. If the server determines that the download management application is not installed at the user computer, the method advances to block 710, and the server sends the download management application to the user computer for installation. The download management application is adapted to download the media content item and to automatically add the media content item to a pre-selected media content player.

At block 712, in a particular embodiment, the server receives an additional request for the media content item from the download management application. Moving to block 714, the server re-directs the download management application to a media source to download the media content item. Proceeding to block 716, the server increments one or more counters related to the download of media content items, to the download of the requested media content item, or a combination thereof. The method terminates at 718.

The descriptions of FIGS. 3-7 are illustrative only. In some embodiments, the disclosed methods can be performed as described herein. In other embodiments, some aspects of the disclosed methods can be performed in alternative sequences other than those described, or simultaneously.

Referring to FIG. 8, an illustrative embodiment of a graphical user interface (GUI) of an online site offering media content is illustrated and designated generally 800. The GUI 800 includes an identification of a media content item 802, such as an individual song, and a price 804 to download the media content item 802. In the embodiment illustrated, the GUI 800 can include a one-click indicator 806 that can be selected to download the media content item 802, pay the purchase price 804, and have the media content item 802 added to a pre-selected media content player application by a download management application at a user computer. The GUI also includes a selectable indicator 808 of an option to download the download management application.

As illustrated in FIG. 8, the GUI 800 includes details 810 regarding the individual media content item 802, such as an individual song, rather than providing details only regarding a collection, such as an album or compact disc (CD). The details 810 can include, for instance, a release date of the song, an album or other collection with which the song is associated, a name or other information regarding a performer of the song, liner notes and trivia items related to the song, a record company associated with the song, a producer associated with the song, an arrangement of the song (e.g., live, remix, duet featuring another performer) other details, or any combination thereof. Further, the GUI 800 includes other features, such as a picture of an album cover 812, CD jacket, or movie poster or jacket associated with the media content item 802. The GUI 800 can include multiple views 813, such as separate selectable pictures of a front and back of an album, or the front, back, and inside portions of a CD or movie jacket. In addition, the GUI 800 can include information regarding song recommendations 814 and customer reviews 816 specifically related to the individual song or other media content item.

Figure 9:
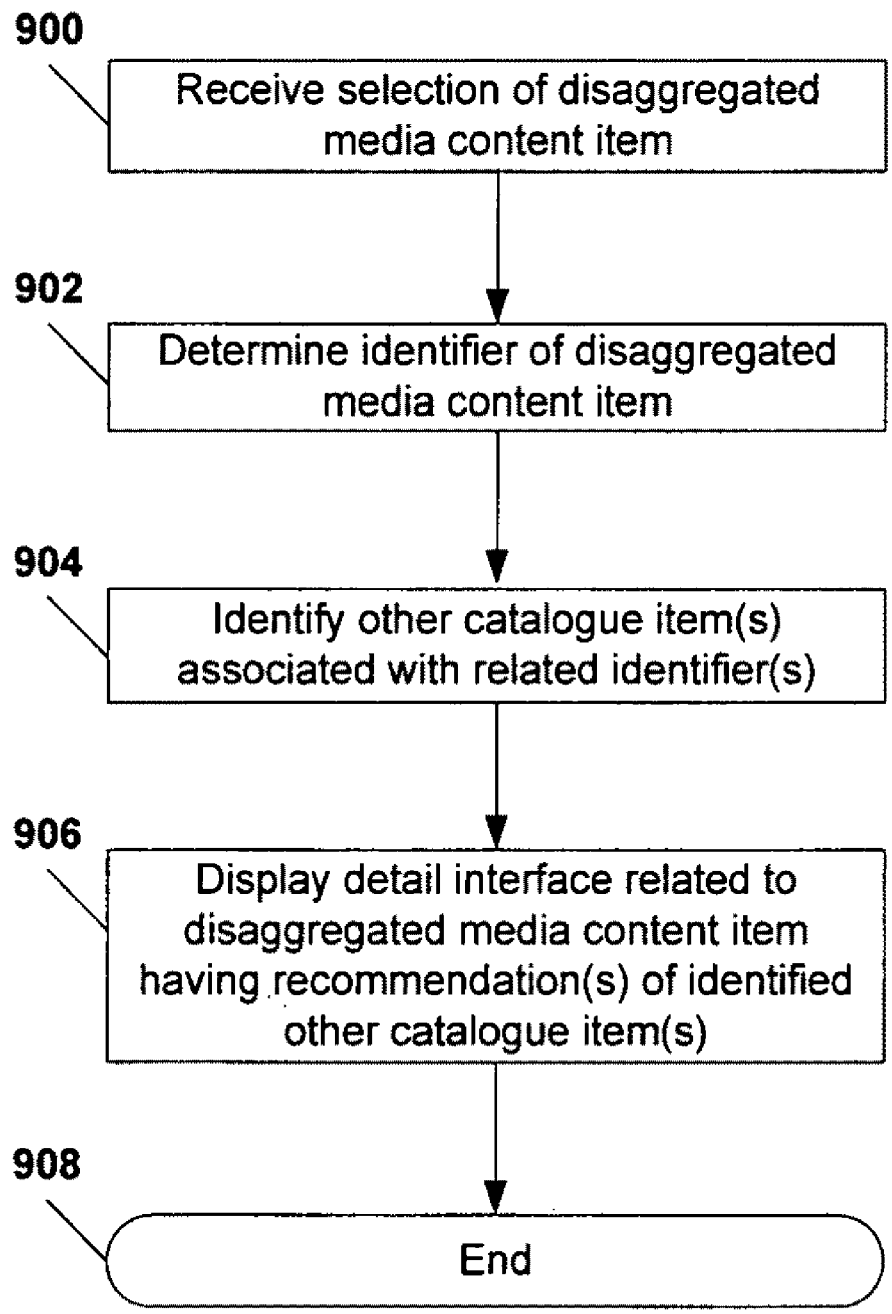
FIG. 9 is a flow diagram illustrating a particular embodiment of a method of offering media content.

Referring to FIG. 9, a particular embodiment of a method of offering media content is illustrated. At block 900, a server providing an online site at which a catalog of items are offered receives a selection of a disaggregated media content item, such as a song, a movie, a scene of a movie, a book chapter, or another audio or video item, via the online site. A video item may include text, images, graphics, other visual aspects, or any combination thereof. Moving to block 902, the server determines an identifier of the disaggregated media content item. Proceeding to block 904, the server identifies one or more other catalog items offered via the online site, which are associated with identifiers related to the identifier of the selected disaggregated media content item. Continuing to block 906, the server displays a detail interface related to the disaggregated media content item via the online site. The detail interface includes details related to the disaggregated media content item and recommendations of the other catalog item(s) identified by the server. The method terminates at 908.

Figure 10:
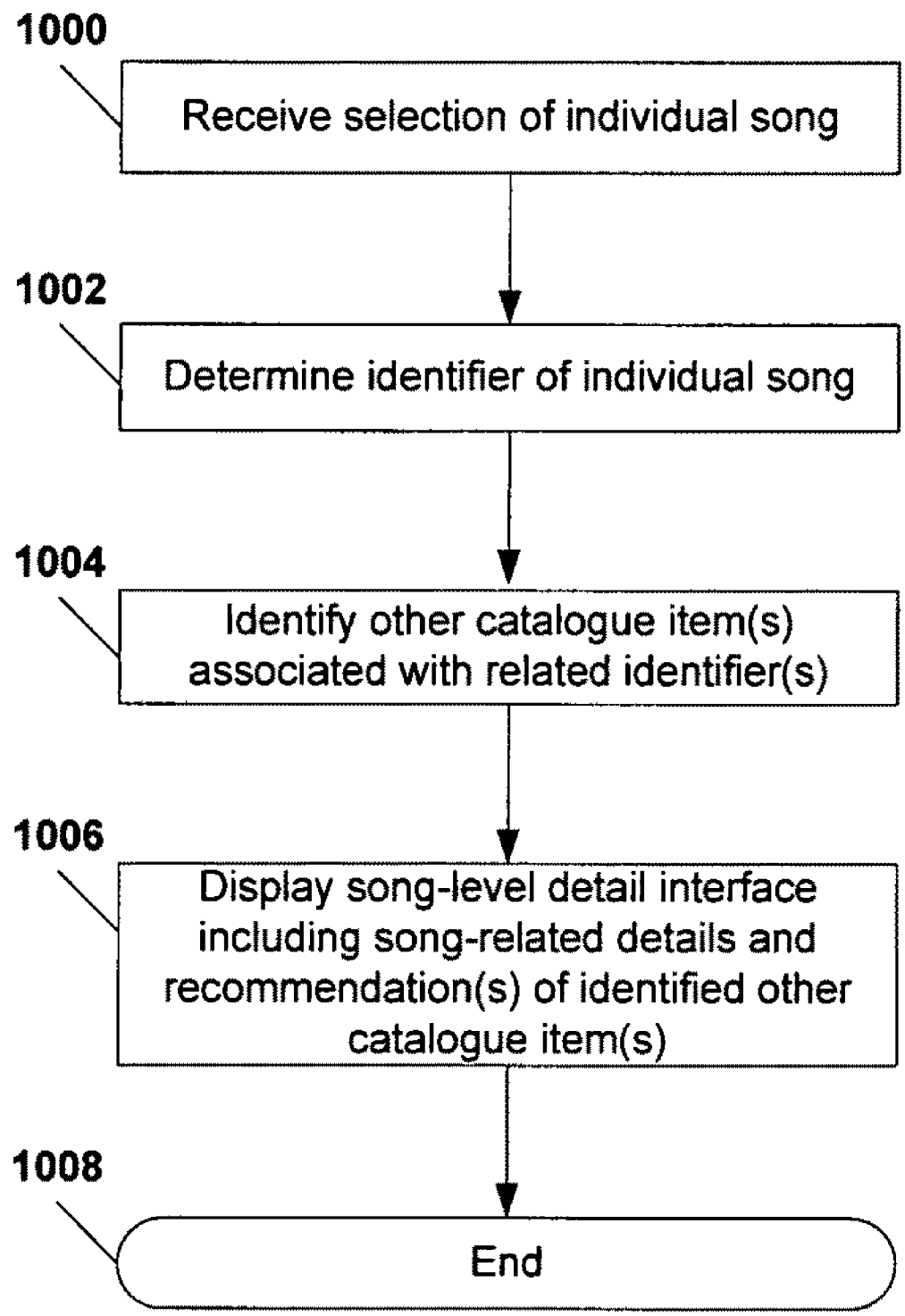
FIG. 10 is a flow diagram illustrating a second particular embodiment of a method of offering media content.

Referring to FIG. 10, a second particular embodiment of a method of offering media content is illustrated. At block 1000, a server providing an online site at which a catalog of items are offered receives a selection of an individual song via the online site. Moving to block 1002, the server determines an identifier of the individual song. Proceeding to block 1004, the server identifies one or more other catalog items offered via the online site, which are associated with identifiers related to the identifier of the selected song. Continuing to block 1006, the server displays a detail interface related to the individual song via the online site. The song-level detail interface includes details related to the individual song, such as a release date, an album with which the song is associated, other details, or any combination thereof, and recommendations of the other catalog item(s) identified by the server. The method terminates at 1008.

In one example, if the selection received at the server relates to the song, "Immortality" featuring Celine Dion, the server determines an identifier of the song. In addition, the server identifies other catalog items related to Celine Dion based on their identifiers. Such items could include, for instance, Celine perfume, a Celine Dion ringtone, a Celine Dion CD, a Celine Dion DVD, Celine Dion concert tickets, other related items, or any combination thereof. The server can display a song-level detail interface related to the song "Immortality" via the online site, which includes details related to the song and recommendations of the other identified catalog items(s) related to Celine Dion. An example of a song-level detail interface is illustrated in FIG. 8.

Figure 11:
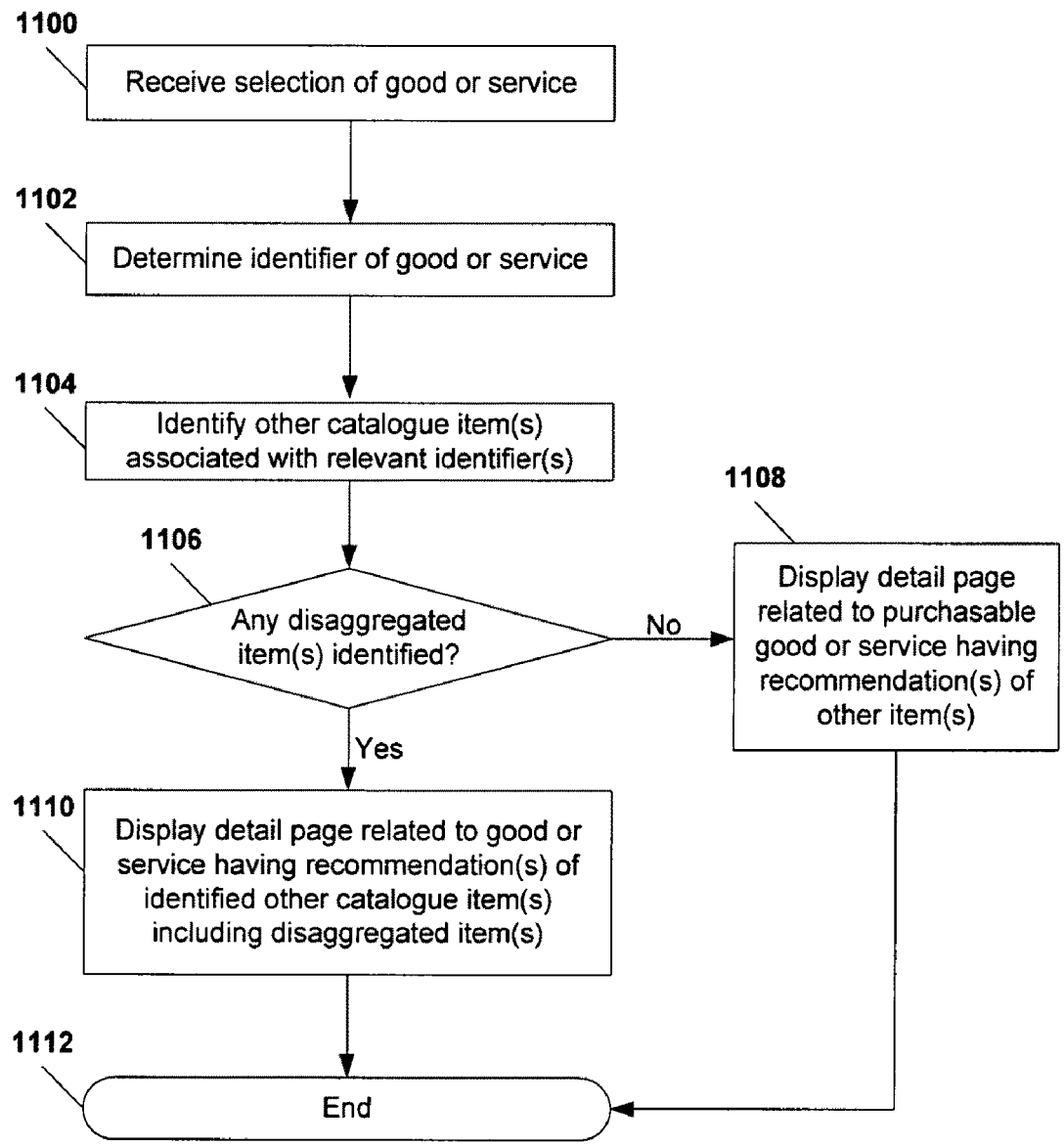
FIG. 11 is a flow diagram illustrating a third particular embodiment of a method of offering media content.

Referring to FIG. 11, a third particular embodiment of a method of offering media content is illustrated. At block 1100, a server providing an online site at which a catalog of items are offered receives a selection of a purchasable item, such as a good or service, via the online site. Moving to block 1102, the server determines an identifier of the purchasable item. Proceeding to block 1104, the server identifies one or more other catalog items offered via the online site, which are associated with identifiers related to the identifier of the selected purchasable item. Continuing to decision node 1106, the server determines whether it has identified any disaggregated items.

If the server has not identified one or more disaggregated items, the method advances to block 1108, and the server displays a detail interface related to the purchasable item via the online site, where the detail page includes recommendations of one or more other purchasable items. Returning to decision node 1106, if the server has identified one or more disaggregated items, the method moves to block 1110, and the server displays a detail interface related to the purchasable item via the online site, where the detail page includes recommendations of the disaggregated item(s). The detail page can also include recommendations of one or more other purchasable items. The method terminates at 1112.

Figure 12:
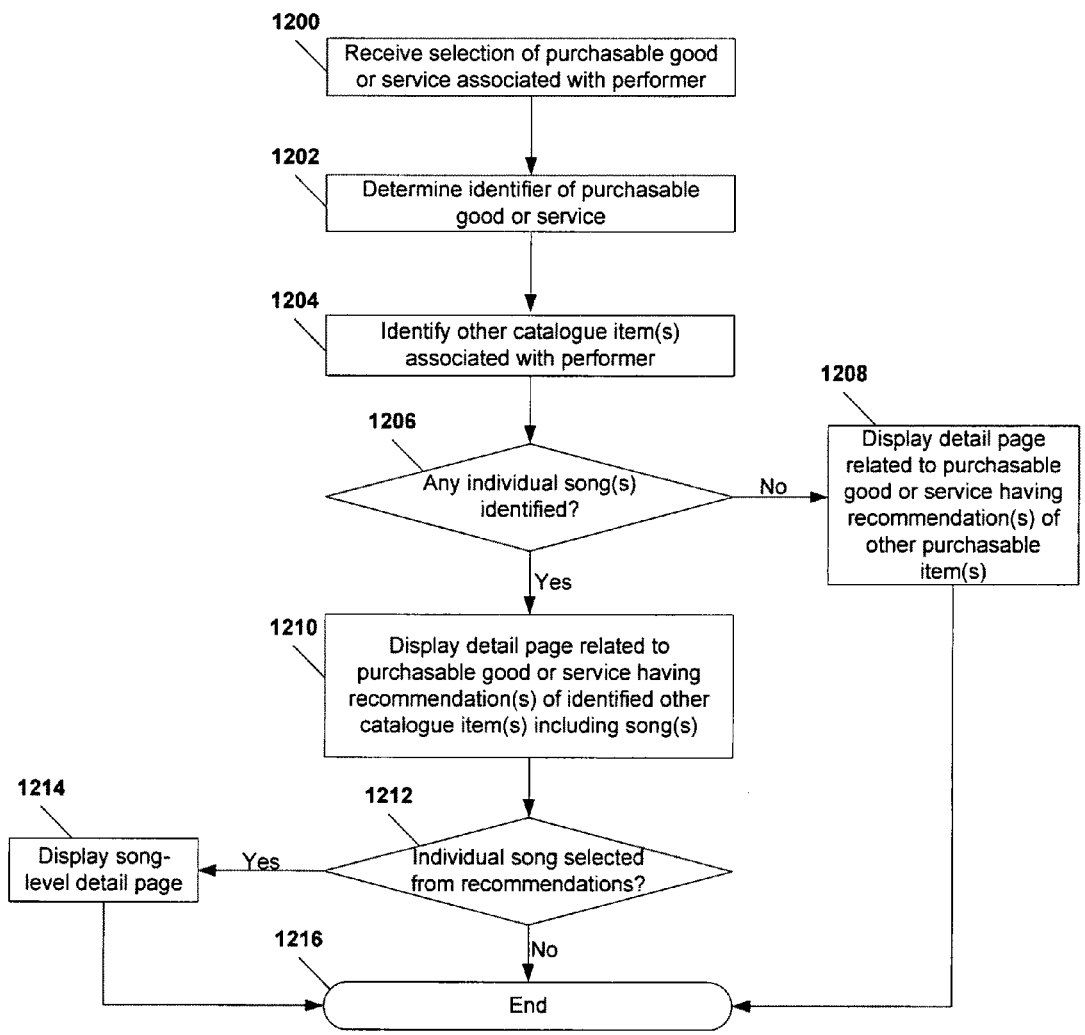
FIG. 12 is a flow diagram illustrating a fourth particular embodiment of a method of offering media content.

Referring to FIG. 12, a fourth particular embodiment of a method of offering media content is illustrated. At block 1200, a server providing an online site at which a catalog of items are offered receives a selection of a purchasable good associated with a performer, via the online site. For instance, the purchasable item can be a digital video disc (DVD) "RUSH in Rio," featuring a live performance by the rock band RUSH. Moving to block 1202, the server determines an identifier of the purchasable item, such as an Amazon standard identification number (ASIN), a stock-keeping unit (SKU) number, or another identification. Proceeding to block 1204, the server identifies one or more other catalog items offered via the online site, which are associated with identifiers related to the identifier of the selected purchasable item. Continuing to decision node 1206, the server determines whether it has identified any disaggregated items related to RUSH.

If the server has not identified one or more disaggregated items, the method advances to block 1208, and the server displays a detail interface related to the purchasable item via the online site, where the detail page includes recommendations of one or more other purchasable items, such as a CD version of "Rush in Rio" or other RUSH CDs or merchandise. Returning to decision node 1206, if the server has identified one or more disaggregated items, the method moves to block 1210, and the server displays a detail interface related to the purchasable item via the online site, where the detail page includes recommendations of the disaggregated item(s). For instance, the detail page could recommend a new single or another individual song by RUSH, such as "Far Cry," for download. The detail page can also include recommendations of one or more other purchasable items.

At decision node 1212, the server can determine whether an individual song has been selected from the recommendations. If an individual song has been selected, the method proceeds to block 1214, and a song-level detail page related to the selected song is displayed via the online site. The method terminates at 1216.

The descriptions of FIGS. 9-12 are illustrative only. In some embodiments, the disclosed methods can be performed as described herein. In other embodiments, some aspects of the disclosed methods can be performed in alternative sequences other than those described, or simultaneously.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments that fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of offering media content, the method comprising:

receiving, from a user computer, a selection from an item catalog of a media content item disaggregated from an aggregation of media content items available from the item catalog, wherein the aggregation of media content items is identified in the item catalog by a unique identifier assigned to the aggregation of media content items, and wherein the selected disaggregated media content item is identified in the item catalog by a unique identifier assigned to the selected disaggregated media content item, and wherein the unique identifier assigned to the selected disaggregated media content item is different from the unique identifier assigned to the aggregation of media content items;

identifying, by a server, from the item catalog at least one other item related to the selected disaggregated media content item, the at least one other item identified in the catalog of items by a unique identifier assigned to the at least one other item; and generating a user interface for display on the user computer in response to receiving the selection of the media content item, the user interface including:

data related to the selected disaggregated media content item, wherein the data is retrieved from the item catalog using the unique identifier for the selected disaggregated media content item, and data related to the at least one other item, wherein the data is retrieved from the item catalog using the unique identifier for the at least one other item.

2. The method of claim 1, wherein the selected disaggregated media content item includes at least one of video content and audio content that is offered for electronic transfer to the user computer.

3. The method of claim 1, wherein the selected disaggregated media content item is an individual song and the aggregation of digital media content from which the individual song is disaggregated is an album.

4. The method of claim 3, wherein the user interface further includes at least one of a release date of the individual song, a performer name, an album title, an album cover picture, a user review of the individual song, and a price for the individual song.

5. The method of claim 3, wherein the at least one other item is associated with a performer of the individual song.

6. The method of claim 5, wherein the at least one other item is a second disaggregated media content item associated with the performer.

7. A method of offering media content, the method comprising:

receiving, from a user computer, a selection of an individual media content item belonging to an aggregation of media content items available from an item catalog;

in response to receiving the selection of the individual media content item at a server, identifying, by the server, at least one other item related to the individual media content item; and generating a user interface display for the individual media content item, the user interface display including data related to:

the individual media content item, wherein the data is retrieved from the item catalog using a unique identifier that identifies the individual media content item rather than the aggregation of media content items to which the individual media content item belongs; and a recommendation for the at least one other item.

8. The method of claim 7, wherein the individual media content item is an individual song and wherein the aggregation of media content items is an album of songs.

9. The method of claim 8, wherein the at least one other item is at least one of a different version of the individual song, a different format offering for the individual song, and another item related to a performer of the individual song.

10. A system to offer media content, the system comprising:

a data store that stores a catalog of items; and a media content server in communication with the data store, the media content server having a processor and memory, wherein the memory includes instructions executable by the processor to:

receive from a user computer a selection of a disaggregated media content item from the catalog of items stored in the data store, the selected disaggregated media content item belonging to an aggregation of media content items available from the catalog of items stored in the data store, wherein the aggregation of media content items is identified in the catalog of items by a unique identifier assigned to the aggregation of media content items, and wherein the selected disaggregated media content item is identified in the catalog of items by a unique identifier assigned to the selected disaggregated media content item, and wherein the unique identifier assigned to the selected disaggregated media content item is different from the unique identifier assigned to the aggregation of media content items;

identify a catalog item related to the selected disaggregated media content item; and generate a user interface display for the selected disaggregated media content item in response to receiving the selection of the disaggregated media content item, the user interface display including data related to:

the selected disaggregated media content item, wherein the data is retrieved from the data store using the unique identifier that identifies the selected disaggregated media content item, and the identified catalog item.

11. The system of claim 10, wherein the identified catalog item is an item associated with an actor and wherein the selected disaggregated media content item is a video content item in which the actor appears.

12. A computer-readable medium having a computer-executable component that includes instructions executable by a processor to offer media content from a catalog of items, the computer executable component comprising:

a user interface component operative to generate for display a detail page describing a song item that is identified in the catalog of items by a unique identifier, wherein the user interface component generates the song item detail page in response to selection of the song item, and wherein the user interface component generates the song item detail page using data describing the song item that is retrieved from the catalog of items using the unique identifier for the song item, the data comprising:

a plurality of details related to the song item; and at least one recommendation of at least one other item associated with the song item, wherein the at least one other item is identified in the catalog of items.

13. The computer-readable medium of claim 12, wherein the plurality of details comprises at least one of a name of a performer of the song item, a name of a song collection with which the song item is associated, a release date of the song item, liner notes associated with the song item, a record company associated with the song item, a producer associated with the song item, and an arrangement associated with the song item.

14. The computer-readable medium of claim 12, wherein the data describing the song item that is retrieved from the catalog of items using the unique identifier for the song item further comprises at least one customer review of the song item.

15. The computer-readable medium of claim 12, wherein the user interface component is further operative to generate a one-click indicator selectable to initiate electronic transfer of the song item, submit payment for the song item, and add the song item to a pre-selected media content player.

16. A computer-readable medium including processor-readable instructions that are executable by a processor to:

receive, from a user computer, a selection of a disaggregated media content item belonging to an aggregation of media content items available from an item catalog;

in response to receipt of the selection of the disaggregated media content item, identify a catalog item related to the selected disaggregated media content item; and generate a user interface display for the selected disaggregated media content item, the user interface display including data related to:

the selected disaggregated media content item, wherein the data is retrieved from the item catalog using a unique identifier that identifies the selected disaggregated media content item rather than the aggregation of media content items to which the selected disaggregated media content item belongs; and a recommendation for the identified catalog item.

17. The computer readable medium of claim 16, wherein the processor-readable instructions are further executable by a processor to identify a plurality of catalog items related to the selected disaggregated media content item.

18. The computer-readable medium of claim 16, wherein the plurality of identified catalog items include at least one of a purchasable item and a disaggregated media content item.

* * * * *